United States Patent Office 2,898,047
Patented Aug. 4, 1959

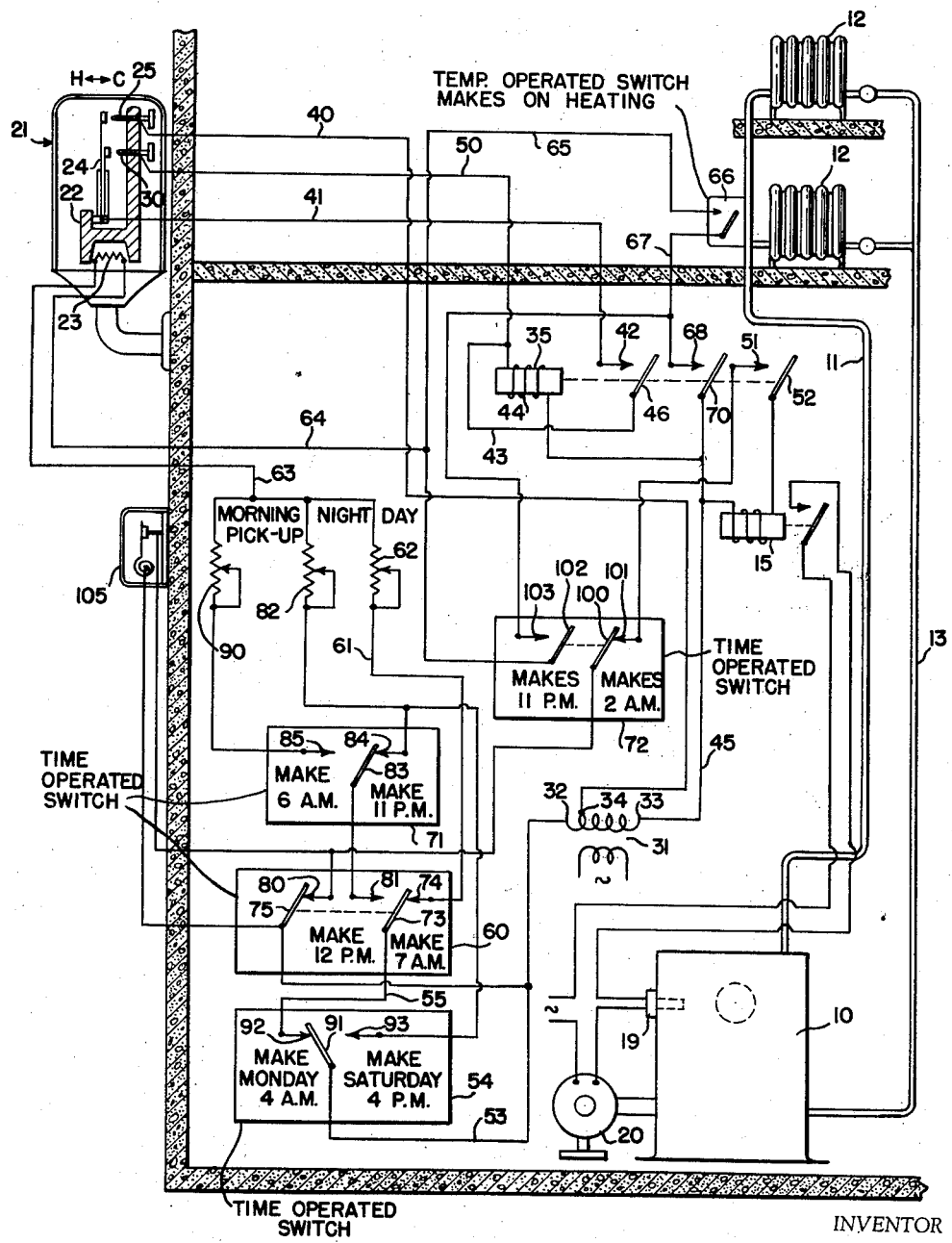

2,898,047

TIME SCHEDULED CONDITION CONTROL SYSTEM

Gene T. Gaddis, Edina, Minn., assignor to Minneapolis-Honeywell Regulator Company, Minneapolis, Minn., a corporation of Delaware Application June 7, 1954, Serial No. 434,935

5 Claims. (Cl. 236—46)

This invention is concerned with an improved heating control system, in particular a system having an outdoor controller for maintaining a normal daytime temperature and a lower night temperature, the reduction in temperature, when the changeover is made, being accomplished in a minimum time.

In heating control systems comprising outdoor controllers the building heat furnishing means or furnace is normally cycled at a predetermined rate for a given outdoor weather. Upon a transfer to night control when a reduced building temperature is desired, the rate of cycling is decreased; however, the reduction of the building temperature is slow and frequently the desired night temperature is not reached before morning when the day temperature is again restored. This condition is particularly undesirable in an apartment building where a reduced night temperature is conducive to sleeping comfort. Such an excessive night temperature also increases the heating expense.

A representative building thermostat has been used in the past so that the furnace is shut off upon the transfer to night control until the lower night temperature was reached; however, a considerable amount of difficulty and expense is normally experienced in finding a location for such a representative thermostat. Even when an adequate location is found there is no assurance that the thermostat won't be adjusted to satisfy individual needs in that particular location of the building. The apparatus of this invention requires no representative thermostat as the furnace is shut down for a predetermined period at the beginning of the night set-back period to permit the building to naturally cool down to the lower night temperature.

It is therefore the object of the present invention to provide an improved control apparatus using an outdoor controller for maintaining a daytime temperature and a night temperature and to provide a predetermined period of interruption of the heat furnishing means upon entering the night period so that the temperature will be reduced to the lower value in a minimum time.

A further object of the present invention is to provide control apparatus for controlling the condition of an enclosure in proportion to the condition of the surrounding space in which a first level of condition is maintained during one period and a second level during a subsequent period and a transfer is provided from the first level to the second level in a minimum time.

Another object of the present invention is to provide an improved and less expensive control apparatus for maintaining a first and a second temperature in an enclosure in proportion to the outside temperature and a transfer from one temperature to the other in a minimum period of time.

Other objects and advantages of the invention will become apparent upon an examination of the specification and drawing.

A single figure is a schematic representation of one form of the present invention.

Referring to the figure the invention is shown connected in a manner to control the operation of a furnace 10 for furnishing a quantity of heated medium, in this particular case steam, through a riser 11 to radiators 12 of which two are shown. The condensate returns from the radiators to the furnace through a return pipe 13. Heat is furnished to the furnace by a burner 20 which is connected to a source of power through a conventional limit control 19 and a main control relay 15. While one particular type of heating plant is shown it is obvious that the invention is adaptable to any conventional heating installation for delivering heat to a building or dwelling.

An outdoor controller 21 is mounted on the side of the building responding to the worst atmospheric condition experienced by the building or portion thereof controlled by the system, including temperature, wind, and solar radiation. The controller comprises a block of metal 22 heated by a heater 23. A temperature responsive bimetal 24 engages a pair of contacts 25 and 30 when the temperature of the controller decreases. A source of power 31 having end terminals 32 and 33 and a tap 34 is connected to a relay 35 when bimetal 24 engages contacts 25 and 30 by a circuit traced as follows: from tap 34, a conductor 40, contact 25, bimetal 24, contact 30, a conductor 50, a relay winding 44, a conductor 45, and end terminal 33. Bimetal 24 is also connected to relay winding 44 through a holding circuit comprising a conductor 41, a contact 42 and its associated blade 46 and conductor 43. When the temperature of controller 21 drops bimetal 24 moves to the right engaging contact 25 and then 30 to energize relay 35. As the temperature of the controller increases an operating differential for relay 35 is established as only contact 25 is effective, the holding circuit shunting contact 30.

A second contact 51 is engaged by a blade 52 when relay 35 is energized for connecting relay 15 to power source 31. Whenever the controller 21 energizes relay 35 to bring about operation of the furnace, heater 23 is energized and the amount of heat supplied to controller 21 is regulated so that the heating load of controller 21 is proportional to the heating load of the building in which the temperature is being controlled. To schedule the operation of the controller so that a correct balance is maintained the resistance in the heater circuit is calibrated for a particular temperature desired in the building. During different periods of the day the temperature in the building is changed by automatically shifting the resistance in the heater circuit, such a scheduling arrangement provides for a normal daytime temperature, a night set-back temperature, and morning pickup. The heater is shown connected for day temperature operation through a circuit as follows: end terminal 32, a conductor 53, a switch 54, a conductor 55, a switch 60, a conductor 61, a rheostat 62 having a movable wiper thereon, a conductor 63, heater 23, a conductor 64, a conductor 65, a temperature responsive switch 66, a conductor 67, a third contact 68 which is engaged by a blade 70 when relay 35 is energized, and conductor 45. Switch 66 is normally mounted in supply riser 11 within 15 feet of the last radiator in the building and closes when steam is present indicating that heat is being delivered to the building. Heater 23 will not be energized until switch 66 closes.

Switches 54, 60, 71, and 72 are conventional timer motor operated switches and to simplify the schematic drawing they are shown in block form with the contacts and blades. An associated legend indicates when the blades move in one particular direction or the other. For example, switch 60 as shown operates in that direction at 7 a.m. and remains in that manner until 12 midnight at which time the armatures move to the left and remain there until 7 a.m. Such a switching arrangement is readily accomplished by a cam operated mercury switch which is familiar to one skilled in the art and is readily available on the commercial market. As shown a blade 73 of switch 60 engages a contact 74 and a blade 75 engages a contact 80. At 12 o'clock p.m. armature 73 engages a contact 81. This operation changes the circuit of heater 23 so a rheostat 82, also having a movable wiper for calibration purposes, is connected between conductors 53 and 63. This rheostat would be adjusted so that a greater amount of heat was supplied to controller 21 reducing the building temperature during the night. A blade 83 of switch 71 is shown engaging a contact 84; however, at 6 o'clock a.m. the blade moves to the left to engage a contact 85. A rheostat 90 is then connected in the heater circuit between conductors 53 and 63. The resistance of this circuit is selected so that less heat is delivered to controller 21 for a short period after 6 a.m. to provide for the restoration of the building temperature from the reduced night temperature to the normal day temperature, this morning pickup being adjusted for the particular building on which the control apparatus is used. As switch 60 operates to move blade 73 to the right at 7 o'clock a.m. the morning pickup period for this particular form of the invention is selected to be one hour and at the end of that hour the controller again maintains the day temperature in the building. A blade 91 of switch 54 engages a contact 92 to maintain the day operation; however, movement of blade 91 to engage contact 93 provides a shunt circuit to bypass switches 60 and 71 to connect the night rheostat in the heater circuit. The operation of blade 91 to the right at 4 o'clock p.m. on Saturday and back to the left at 4 o'clock a.m. on Monday, provides for a reduced temperature over the weekend.

The controller regulates the delivery of heat to the radiators to maintain a day temperature as selected by rheostat 62 and upon operation of switch 60 the controller will cycle the furnace a less amount, all other conditions remaining the same, as selected by rheostat 82. As there is an inherent lag in the change of the building temperature the temperature is not immediately reduced to the lower night temperature, this reduction normally being slowed down by the operation of the furnace 10 under the night schedule. Such is often undesirable as a reduced temperature during the night is conducive to comfort and as in this particular case at 11 p.m. the tenants in the building would expect to experience a reduction in the temperature of their radiators within a short time. From the economy standpoint it would also be undesirable to have the furnace operate under the night shutdown schedule only a short time after the transfer to night control. Under certain weather conditions it is possible that the selected night temperature for the building would never be reached before the morning pickup as the periodic operation of the furnace 10 under the night schedule could possibly prevent the temperature of the building from dropping to the selected night temperature.

To provide for better control of the building temperature by reducing the temperature in the building upon transfer to night control in a minimum time, a blade 100 which normally engages a contact 101 is moved to the left when switch 72 operates at 11 p.m. to open the circuit of relay 15 rendering the burner inoperative. As the switch does not operate again until 2 o'clock a.m. a three-hour period of no operation of the burner or valve is provided, thus preventing the delivery of heat to the building during that period. With such apparatus the reduction in building temperature upon switching to night setback takes place within a relatively short period as the less frequent pulses of heat delivered to the building for night setback are altogether eliminated for a predetermined period and the building is allowed to naturally cool down.

A blade 102 of switch 72 engages contact 103 upon moving to the left at 11 o'clock p.m. to provide a circuit to shunt switch 66 so that controller 21 will remain in standby operation during the three hour period when heat is not delivered to the building. Continuous operation of the controller prevents the possibility of an overshooting of the building temperature when the switch 72 restores furnace operation after the shutdown period. For example, assume that the outdoor temperature was low and the shutdown period started, controller 21 would cool off rapidly and upon a restoration of the furnace control by switch 72 a considerable amount of heat would be necessary to bring the temperature of the controller up to normal, this possibly resulting in an overshoot of the desired temperature for the building.

A second bimetal temperature responsive switch 105 is located outside of the building and is calibrated to open at some particular outdoor temperature at which no operation of the furnace is desired to maintain a night temperature or morning pickup. This is particularly desirable in mild weather when the building temperature does not decrease a sufficient amount to justify night operation and morning pickup. In a typical installation switch 105 would open when the outdoor temperature is approximately 50°. Switch 105 is connected in parallel with blade 75 and contact 80 so that when blade 75 moves to the left at 12 o'clock p.m. switch 105 will determine whether the relay 15 is energized during the night and morning pickup periods; however, it will be taken out of the circuit upon a return of the normal daytime control.

*Operation*

As shown in the figure, controller 21 is satisfied and boiler 10 is not delivering steam to the building. As the temperature of the controller drops, the burner is energized and the steam begins to distribute in the mains. As switch 66 is open no heat would be supplied to controller 21 until the last radiator in the heating plant begins to receive steam. When the temperature of the controller increases to the cut-out point, the delivery of steam to the radiators stops. Controller 21 would cycle and the heater 23 would maintain a temperature in the controller so that the rate of heat supplied to the building would be proportional to the heat supplied to the controller, a relation being established by rheostat 62 for the daytime operation. Upon the switchover to night setback operation at 11 o'clock p.m. by switch 72 the heating plant is made ineffective so that the building temperature drops as fast as possible, there being no heat delivered to it at this time. At 2 a.m. switch 72 again restores the heating plant in operation; however, as switch 60 has operated a new relation between the amount of heat supplied to the building and that supplied to controller 21 is selected by night setback rheostat 82. One hour before the beginning of the normal daytime control, switch 71 connects morning pickup rheostat 90 into the heater circuit so that another relation is established and the heat to the building is increased a predetermined amount to restore the building temperature from the night setback level to the normal daytime temperature. Upon operation of switch 60 the daytime control is again established. The predetermined period of no operation of the heating plant at the beginning of the night setback period provides for an improved control in that the night setback temperature is established in a minimum time, this being desirable from a comfort standpoint for the occupants of the building. In an apartment building such a reduction in temperature is particularly desirable as occupants upon retiring prefer to have the temperature reduced within a short period. Such a control apparatus reduces the building temperature in a minimum time without the use of an indoor controller and without waste of heat upon opening of windows by tenants.

This invention controls the temperature of a building completely from the outdoor controller and yet it provides the control advantage of temperature reduction in a minimum time and a minimum fuel consumption as accomplished by a representative building indoor controller. The disadvantages of indoor controllers are the added cost of installing the indoor controller, the proper choice of a representative location for the controller, and of course the frequent individual adjustment to meet personal needs. None of these are experienced in the present apparatus as the building temperature is controlled completely by the outdoor controller.

It is obvious that many substitutions and equivalents will appear to one skilled in the art; hence the scope of this invention should be determined only by the appended claims.

I claim as my invention:

1. In a temperature control system for providing normal temperature control of a building during the day, and a reduced temperature control during the night, an outside controller subject to the same ambient conditions as the building, said controller having temperature responsive means and its own heat furnishing means, main heat furnishing means for supplying heat to the building, relay means, means including said relay means for energizing said first mentioned and said main heat furnishing means to furnish heat proportionally to said controller and the building, said relay means operating in response to said temperature responsive means, schedule means for regulating the rate that heat is furnished to said controller by its heat furnishing means, first timer operated switch means for controlling said schedule means so that less heat is furnished to said outside controller during the daytime than at night, and further timer operated switch means for rendering said main heat furnishing means ineffective for a selected period before entering the night control period so that the building temperature will decrease to the night level more quickly.

2. In a temperature control system for providing normal temperature control of a building during the day, a reduced temperature control during the night, and a pickup temperature control upon returning to day control; outside temperature responsive means housed in a container; first heat furnishing means for heating the building; second heat furnishing means for heating said container; relay means operative in response to said temperature responsive means; means including said relay means for rendering said first and second heat furnishing means effective to heat the building and said container; timer operated means for scheduling the heat output of said first heat furnishing means so that a predetermined daytime temperature and a predetermined night time temperature is maintained in the building, and a morning pickup is accomplished; second timer operated means for rendering said second heat furnishing means ineffective a predetermined period at the start of the night control so that the building temperature can decrease to the night time temperature; and means for rendering said night time and morning pickup temperature control ineffective when the outdoor temperature exceeds a predetermined value.

3. In a temperature control system for providing normal temperature control of a building during one period and a reduced temperature control during a second period, an outside controller having temperature responsive means and its own heat furnishing means, main heat furnishing means for supplying a heated medium to the building, switch means operated in response to said temperature responsive means for controlling both of said heat furnishing means so that a proportional amount of heat is supplied to said controller and said building, timer operated schedule means for controlling the rate that heat is supplied to said controller thereby regulating the temperature in the building, temperature operated switch means responsive to the temperature of said medium at the farthermost location in the building, said switch means rendering said controller heating means ineffective until said medium reaches a predetermined temperature, and timer operated switch means rendering said main heat furnishing means ineffective for a predetermined period of time at the beginning of the second period so that the temperature of the building will drop to the lower value quickly.

4. In a temperature control system, heat furnishing means for furnishing a supply of heated medium to an enclosure, cyclically operative means including temperature responsive means responsive to outdoor temperature for cyclically causing operation of said heat furnishing means for periods of time dependent upon the value of the outdoor temperature and independent of the attainment of any predetermined temperature within said enclosure, timer operated schedule means connected to said cyclically operative means and operative during different periods for reducing the periods of time for a given outdoor temperature during which the heat furnishing means is operated so as to maintain a lower temperature in said enclosure during said different periods, and further timer operated means arranged to prevent said cyclically operated means from causing any operation of said heat furnishing means for a selected period at the beginning of one of said different periods at which a lower temperature is to be maintained so as to cause said lower temperature to be attained more rapidly than if cyclic operation of said heat furnishing means were permitted during said selected period.

5. In a condition control system, condition changing means for changing the value of a first condition within a predetermined area, cyclically operative means including condition responsive means responsive to a second condition outside of said area for cyclically causing operation of said condition changing means for periods of time dependent upon the value of the second condition and independent of the attainment of any predetermined value of said first condition, timer operated schedule means connected to said cyclically operative means and operative during different periods of time during which a different value of said first condition is desired requiring less operation of said condition changing means for reducing the periods of time for a given value of said second condition which the condition changing means is operated, and further timer operated means arranged to prevent said cyclically operated means from causing any operation of said condition changing means for a selected period at the beginning of one of said different periods to cause said first condition to change more rapidly to said different value than would be the case if cyclic operation of said condition changing means were permitted during said selected period.

References Cited in the file of this patent

UNITED STATES PATENTS

| | | |
|---|---|---|
| 1,869,161 | Merrill | July 26, 1932 |
| 1,985,986 | Hall | Jan. 1, 1935 |
| 2,090,073 | Rohlin | Aug. 7, 1937 |
| 2,291,840 | Spangenberg | Aug. 4, 1942 |
| 2,301,040 | Gunther | Nov. 3, 1942 |
| 2,376,482 | Guler | May 22, 1945 |